(12) United States Patent
Middendorf et al.

(10) Patent No.: US 12,438,224 B2
(45) Date of Patent: Oct. 7, 2025

(54) FLAME RESISTANT MATERIALS FOR ELECTRIC VEHICLE BATTERY APPLICATIONS

(71) Applicant: 3M INNOVATIVE PROPERTIES COMPANY, St. Paul, MN (US)

(72) Inventors: Claus H. G. Middendorf, Neuss (DE); Christoph Kuesters, Korschenbroich (DE); Kerstin C. Rosen, Cologne (DE); Bernd Kühneweg, Duesseldorf (DE); Walter R. Romanko, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 701 days.

(21) Appl. No.: 17/781,492

(22) PCT Filed: Dec. 2, 2020

(86) PCT No.: PCT/US2020/062777
§ 371 (c)(1),
(2) Date: Jun. 1, 2022

(87) PCT Pub. No.: WO2021/113281
PCT Pub. Date: Jun. 10, 2021

(65) Prior Publication Data
US 2023/0035787 A1     Feb. 2, 2023

Related U.S. Application Data

(60) Provisional application No. 62/942,279, filed on Dec. 2, 2019.

(51) Int. Cl.
*H01M 10/625*     (2014.01)
*C09D 1/02*     (2006.01)
(Continued)

(52) U.S. Cl.
CPC .............. *H01M 50/24* (2021.01); *C09D 1/02* (2013.01); *C09D 5/18* (2013.01); *C09D 7/61* (2018.01);
(Continued)

(58) Field of Classification Search
CPC .. H01M 50/24; H01M 10/625; H01M 10/658; H01M 50/204; H01M 50/282;
(Continued)

(56) References Cited

U.S. PATENT DOCUMENTS

2007/0197686 A1* 8/2007 Dimanshteyn ........... C09D 5/18
523/179
2011/0165454 A1   7/2011 Iwamoto
(Continued)

FOREIGN PATENT DOCUMENTS

EP         2560817 B1    6/2020
JP         S61120872 A   6/1986
(Continued)

OTHER PUBLICATIONS

Machine translation of CN1274778C.*
(Continued)

*Primary Examiner* — Matthew T Martin
*Assistant Examiner* — Felicity B Alban
(74) *Attorney, Agent, or Firm* — Carlos M. Téllez Rodríguez; 3M Innovative Properties Co

(57) ABSTRACT

A fire protection coating and a fire barrier coated article are provided that comprise an inorganic binder and at least one inorganic filler, wherein the inorganic binder is selected from potassium silicate, sodium silicate, or a combination thereof, and wherein the at least one inorganic filler is selected from kaolin clay, talc, mica, mullite, phlogopite, muscovite montmorillonite, smectite, bentonite, illite, chlorite, sepiolite, attapulgite, halloysite, vermiculite, laponite,
(Continued)

rectorite, perlite, and combinations thereof. The fire barrier article comprises flame resistant substrate layer having a first major surface and a second major surface, and a fire protection coating disposed on the first major surface of the flame resistant substrate layer.

7 Claims, 1 Drawing Sheet

(51) Int. Cl.
  *C09D 5/18* (2006.01)
  *C09D 7/61* (2018.01)
  *C09D 133/04* (2006.01)
  *H01M 10/658* (2014.01)
  *H01M 50/204* (2021.01)
  *H01M 50/24* (2021.01)
  *H01M 50/282* (2021.01)
  *H01M 50/293* (2021.01)

(52) U.S. Cl.
  CPC ........ *C09D 133/04* (2013.01); *H01M 10/625* (2015.04); *H01M 10/658* (2015.04); *H01M 50/204* (2021.01); *H01M 50/282* (2021.01); *H01M 50/293* (2021.01); *H01M 2220/20* (2013.01)

(58) Field of Classification Search
  CPC ........... H01M 50/293; H01M 2220/20; H01M 10/613; H01M 50/28; C09D 1/02; C09D 5/18; C09D 7/61; C09D 133/04; C09D 7/48; Y02E 60/10; C08K 3/346
  See application file for complete search history.

(56) References Cited

U.S. PATENT DOCUMENTS

| | | | | |
|---|---|---|---|---|
| 2015/0194641 | A1* | 7/2015 | Tsuji | H01M 10/658 429/156 |
| 2019/0207188 | A1* | 7/2019 | Miller | C09D 7/70 |

FOREIGN PATENT DOCUMENTS

| | | |
|---|---|---|
| JP | H0532461 B2 | 5/1993 |
| WO | 2001096074 A2 | 12/2001 |
| WO | 2010026731 A1 | 3/2010 |
| WO | 2010105027 A2 | 9/2010 |
| WO | 2012148468 A1 | 11/2012 |
| WO | 2015179597 A1 | 11/2015 |
| WO | 2015179625 A1 | 11/2015 |
| WO | 2020023357 A1 | 1/2020 |
| WO | 2021113278 A1 | 6/2021 |

OTHER PUBLICATIONS

"What Do We Know About Next-Generation NMC 811 Cathode?", Research Interfaces, Available on Feb. 27, 2018, URL: <https://researchinterfaces.com/know-next-generation-nmc-811-cathode/>, 9 pages.

Fleischhammer, "Safety Hazard of Cell Materials", pp. 167-195 (2019).

International Search Report for PCT Application No. PCT/US2020/062777, mailed on Mar. 17, 2021, 5 pages.

* cited by examiner

FLAME RESISTANT MATERIALS FOR ELECTRIC VEHICLE BATTERY APPLICATIONS

CROSS REFERENCE TO RELATED APPLICATIONS

This application is a national stage filing under 35 U.S.C. 371 of PCT/US2020/062777, filed Dec. 2, 2020, which claims the benefit of Provisional Application No. 62/942,279, filed Dec. 2, 2019, the disclosures of each of which are incorporated herein by reference in their entireties.

BACKGROUND OF THE INVENTION

Field of the Invention

The present invention relates to electric vehicle battery modules and particularly to fire barrier articles for managing battery module thermal runaway incidents. The provided articles can be especially useful, for example, in automotive and stationary energy storage applications.

Background

Today, the market and supporting technologies for battery supported hybrid or fully electrical driven vehicles are rapidly expanding. Rechargeable batteries, including nickel metal hydride or lithium-ion batteries are used to store energy and provide power in electric and hybrid electric vehicles. The flow of current either into the battery during recharging or out of the battery into the vehicle and its accessories generates heat. Operation outside the bounds of the specified range can damage or accelerate degradation of cells within the battery.

Electrical vehicle batteries are made up of several battery modules, and each battery module comprises many interconnected individual battery cells. When one cell in a battery module is damaged or faulty in its operation, temperatures in the cell may increase faster than heat can be removed from the module. If this temperature buildup continues unchecked, a catastrophic phenomenon called thermal runaway can occur resulting in the cell catching on fire. The resulting fire can spread very quickly to neighboring cells and then to cells throughout the entire battery in a chain reaction. These fires can be potentially massive and can spread to surrounding structures and endanger occupants of the vehicle or structures in which these batteries are located.

When thermal runaway occurs in a cell, it is desirable for a thermal management system to block or absorb the heat and prevent adjacent cells or modules from overheating and themselves entering thermal runaway. The severe risks posed by thermal runaway event requires battery modules to be designed with thermally insulating fire barriers to mitigate the effect of the thermal runaway event and provide time for occupants to safely vacate the vehicle in the event of a fire.

SUMMARY

In one aspect of the invention, a fire protection coating is provided that comprises an inorganic binder and at least one inorganic filler. The fire protection coating composition comprises an inorganic binder and at least one inorganic filler, wherein the inorganic binder is selected from potassium silicate, sodium silicate, or a combination thereof, and wherein the at least one inorganic filler is selected from kaolin clay, talc, mica, mullite, phlogopite, muscovite montmorillonite, smectite, bentonite, illite, chlorite, sepiolite, attapulgite, halloysite, vermiculite, laponite, rectorite, perlite, and combinations thereof.

In another aspect of the present invention, a fire barrier article is provided that comprises flame resistant substrate layer having a first major surface and a second major surface and a fire protection coating disposed on a substantial portion of the first major surface of the flame resistant substrate layer, wherein the fire protection coating composition comprises an inorganic binder and at least one inorganic filler, wherein the inorganic binder is selected from potassium silicate, sodium silicate, or a combination thereof, and wherein the at least one inorganic filler is selected from kaolin clay, talc, mica, mullite, phlogopite, muscovite montmorillonite, smectite, bentonite, illite, chlorite, sepiolite, attapulgite, halloysite, vermiculite, laponite, rectorite, perlite, and combinations thereof.

DETAILED DESCRIPTION OF THE EMBODIMENTS

In the following detailed description, reference is made to the accompanying drawings, which form a part hereof, and in which is shown by way of illustration specific embodiments in which the invention can be practiced. In this regard, directional terminology, such as "top," "bottom," "front," "back," "forward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments can utilize structural or logical changes can be made without departing from the scope of the present invention. The following detailed description, therefore, is not to be taken in a limiting sense, and the scope of the present invention is defined by the appended claims.

Protecting against the dangers associated with a sudden fire during a thermal runaway event is a significant technical challenge. Attempting to create a universal solution is difficult to achieve because protecting against one characteristic of a battery fire may cause other types of problems. For example, non-woven polymeric webs and foams can display excellent thermal insulation properties, but common polymers tend to be flammable or need to be coated with encapsulant materials that are flammable. Heat shield materials made from woven non-combustible fibers (e.g., inorganic fibers) can be effective in preventing penetration of a fire but can be too thin to adequately insulate against the intense heat of a fire. Using thicker layers of heat shield materials may too costly. Combinations of these materials could work, but bond dissimilar materials together can be an issue, especially when the selection of bonding materials may be constrained by flammability issues.

The present invention addresses these issues by providing a fire protection coating that forms a protective ceramic surface under thermal runaway conditions, a fire barrier article that combines a fire protection coating disposed on a surface of a flame resistant flame-resistant paper or a flame resistant flame-resistant board. In electric vehicle battery applications, the combination of a relatively thin flame resistant paper or board with a fire protection coating can provide protection, structural integrity and a high degree of thermal insulation in the event of fire exposure.

In one aspect of the invention, a fire protection coating is provided that comprises an inorganic binder and at least one inorganic filler.

In another aspect of the present invention, a fire barrier article is provided that comprises flame resistant substrate layer having a first major surface and a second major surface, and a fire protection coating disposed on a substantial portion of the first major surface of the flame resistant substrate layer.

Figure 1:
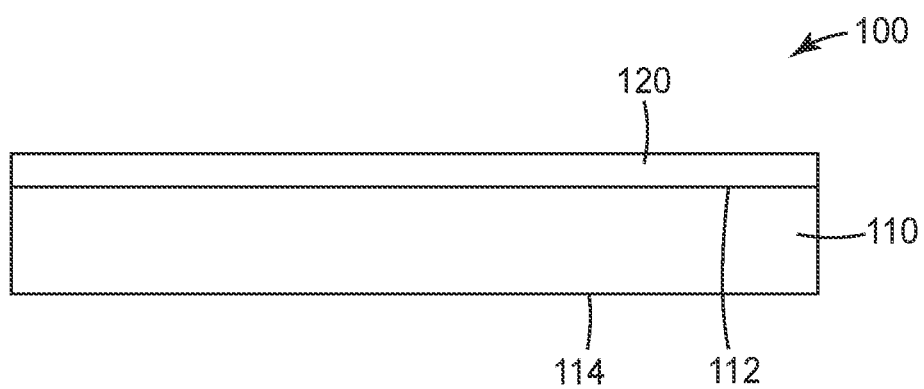
FIG. 1 shows an exemplary battery module that includes a thermal barrier formed from an insulation material according to an aspect of the invention.

A fire barrier article 100 according to one embodiment is shown in FIG. 1. The fire barrier article 100 includes a flame resistant substrate layer 110 having a first major surface 112 and a second major surface 114 and a fire protection coating layer 120 disposed on a substantial portion of the first major surface of the flame resistant substrate layer. The coating layer can be applied by spraying, painting, or the like in thicknesses of 200 microns to 2000 microns, preferably 400 microns to 1000 microns.

Exemplary flame resistant substrate layers useful for the present invention can be flame resistant paper, such as an inorganic paper or mica based paper, an inorganic fabric, flame resistant boards, such as inorganic fiber boards or mica boards or sheets, or flame resistant laminate or multi-layered materials comprising one or more of the aforementioned materials. Inorganic fabrics may comprise E-glass fibers, R-glass fibers, ECR-glass fibers, basalt fibers, ceramic fibers, silicate fibers, Nextel fibers, steel filaments or a combination thereof. The fibers in the inorganic fabric may be chemically treated. The fabrics may for example be a woven or nonwoven mat, a felt, a cloth, a knitted fabric, a stitch bonded fabric, a crocheted fabric, an interlaced fabric or a combination thereof.

The multilayer material according to the invention may also comprise at least one layer comprising inorganic particles or inorganic fibers or a combination thereof and a at least a second layer comprising a flame resistant foam nonwoven mat or other porous material; a flame-resistant fabric material or flame resistant polymeric materials in the form of films or nonwoven materials. The inorganic fibers of the at least one layer comprising inorganic particles or inorganic fibers may be selected from the group of E-glass fibers, S-glass fibers, R-glass fibers, ECR-glass fibers, basalt fibers, ceramic fibers, polycrystalline fibers, silicate fibers, alumina fibers, silica fibers, carbon fibers, silicon carbide fibers, boron silicate fibers or a combination thereof. More specific, the fibrous material may include annealed melt-formed ceramic fibers, sol-gel formed ceramic fibers, polycrystalline ceramic fibers, alumina-silica fibers, glass fibers, including annealed glass fibers or non-bio-persistent fibers. The inorganic fabric may for example be a nonwoven mat, a stitch bonded mat, a needled mat, a chemically bonded mat using either an inorganic binder or a polymeric binder (both of which are described in more detail below) or thermally bonded mat (mono or bicomponent fibers or powders) or a combination thereof. Other fibers are possible as well, if they withstand the high temperatures generated in a thermal event of a Li-ion battery.

Exemplary polymeric binders that can be used to create a chemically bonded mat include (meth)acrylic binders, rubber-based binders, styrene acrylic binders, styrene butadiene binders, urethane acrylate binders, silicone binders, vinyl polymer binders, epoxy binders and the like. In exemplary embodiments, the polymeric binders can be waterborne polymer dispersions based on acrylate-, stryrene-, urethane monomers and the like, or compositions/copolymers thereof.

Exemplary flame resistant polymeric materials include acrylamide based materials; fluoropolymer based materials, oxidized polyacrylonitrile materials and the like.

In some exemplary embodiments, flame resistant substrate layer 110 can be an electrical insulating material such as is described in PCT Publication No. WO 2020/023357, incorporated herein in its entirety. Flame resistant substrate layer 110 can be thermally and electrically insulating and in the form of an inorganic insulating paper or board. Multiple sheets, i.e., plies or sub-layers of inorganic paper layer may be wet laminated and pressed to yield an inorganic board or a multilayer paper material that is thermally and electrically insulating. The term "paper" refers to a flexible single or multilayer material that has sufficient flexibility to be bent around a 3-in. mandrel. The term "board" refers to a relatively stiff material that can be flexed, but which is not capable to wrap around a mandrel.

Flame resistant substrate layer 110 may comprise a combination of inorganic fibers and inorganic particles may be referred to as inorganic papers or boards depending on thickness and flexibility of the insulating material. The flame resistant substrate layer 110 are largely made up of inorganic materials (i.e. inorganic fibers and fillers). In an exemplary embodiment, flame resistant substrate layer 110 comprises at least 95% inorganic materials. In an exemplary embodiment, flame resistant substrate layer 110 comprises at least 96% inorganic materials. The highly inorganic nature of the exemplary flame resistant substrate layer enhances the flame resistance of these materials over other conventional insulating papers. In some embodiments, the flame resistant substrate layer may include small amounts (e.g. less than 5 wt. %) of organic fiber or polymeric additives.

The fire protection coating layer 120 is formed by applying an exemplary coating composition applied by spraying, painting, or the like. The exemplary coating composition of the present invention comprises an inorganic binder and at least one inorganic filler. The exemplary coating composition can be a solvent based coating or an aqueous based coating, preferably an aqueous based coating composition.

Exemplary inorganic binders include sodium silicate, potassium silicate or a combination thereof. In some embodiments, the inorganic binder can be a polysilicate having the formula $M_2O(SiO_2)_n \cdot H_2O$, wherein M is selected from Li, Na, K, preferably K or Na and n is an integer between 1 and 15, preferably between 3 and 9. It is further preferred that the polysilicate is employed in a solvent, preferably water. In other embodiments, the inorganic binder can be $Na_2SiO_3$. The exemplary coating composition comprises 10 wt. %-80 wt. % inorganic binder based on the percent solids in the dried coating, preferably 20 wt. %-60 wt. % inorganic binder.

The particulate inorganic filler content in the coating composition will be from about 20 wt. %-90 wt. % based on the percent solids in the dried coating, preferably 40 wt. %-80 wt. %. Exemplary inorganic fillers include, but are not limited to kaolin clay, talc, mica, mullite, phlogopite, muscovite montmorillonite, smectite, bentonite, illite, chlorite, sepiolite, attapulgite, halloysite, vermiculite, laponite, rectorite, perlite, glass fibers, ceramic fibers and combinations thereof. Suitable types of kaolin clay include, but are not limited to, water-washed kaolin clay, metakaolin clay, delaminated kaolin clay, calcined kaolin clay, and surface-treated kaolin clay.

In some embodiments, an polymeric binder material can be added to the exemplary coating composition. Exemplary polymeric binders include (meth)acrylic binders, rubber-based binders, styrene acrylic binders, styrene butadiene binders, urethane acrylate binders, silicone binders, vinyl polymer binders, epoxy binders and the like. In exemplary embodiments, the polymeric binders can be waterborne polymer dispersions based on acrylate-, styrene, urethane monomers and the like, or compositions/copolymers thereof.

In some embodiments, additives can be added to the exemplary coating composition. Exemplary additives include defoamers, surfactants, rheological modifiers, forming aids, pH-adjusting materials, etc. Exemplary rheological modifiers can be an organic compound, preferably wherein the organic compound is selected from polysaccharides, proteins and polyvinyl alcohols, preferably are selected from natural and modified polysaccharides, preferably polysaccharides selected from the list consisting of xanthan, carrageenan, pectin, gellan, xanthan gum, diuthan, cellulose ethers such as carboxymethyl cellulose, methyl cellulose, ethyl cellulose and hydroxyethyl cellulose.

As mentioned previously, the fire protection coating composition may be applied to the first major surface of a flame resistant substrate layer to form exemplary fire barrier article that can be used as a protective device or system, such as a thermal/flame barrier. For example, one or more sheets of an exemplary fire barrier article can be incorporated into or wrapped around a flammable energy storage device, such as lithium ion battery cells, modules, or packs, such as may be found in hybrid or electric vehicles or other electric transportation applications or locations. In other applications, the exemplary fire barrier article can be used as a lid/pack liner for said flammable energy storage devices.

The exemplary fire barrier article of the present invention should prevent heat from flowing from a failing cell or module to an adjacent cell or module or the passenger compartment. For example, the exemplary fire barrier article should provide a high thermal gradient or temperature drop across the material when exposed to high temperature on one side of the material. In an alternative, the exemplary fire barrier article may be used as a thermal barrier wrap or as a thermal barrier lid in an electric vehicle battery pack that can prevent or reduce the rate of heat flow out of the battery pack.

EXAMPLES

These examples are for illustrative purposes only and are not meant to be limiting on the scope of the appended claims. All parts, percentages, ratios, etc. in the examples and the rest of the specification are by weight, unless otherwise noted.

Test Methods

Sandblast Test:

Samples were pre-conditioned at 25° C. or at either 1000° C. or 1200° C. for 10 min in an oven to simulate a thermal runaway event.

For the sandblast test a commercially available sandblast cabinet is used such as a Professional Sand Blasting Desktop Cabinet, from PowerPlus Tools GmbH, (Germany). The sample material is mounted to a metal sheet sample holder having the dimensions of 100 mm by 50 mm. A sample having dimensions of 80 mm by 50 mm is fixed with a masking tape on all sides to the metal sheet. A fixture inside of the cabinet holds the samples in a defined position in front of the nozzle. Compressed air is used to accelerate the sandblast media (Type 211 glass beads, grain size 70-110 μm) against the surface of the sample until the test specimen (i.e. the sample) has been damaged in an area of 4+/−1 mm diameter, and the elapsed time of the test is recorded. In addition, normalized abrasion resistance values are calculated by normalizing the elapsed exposure time by the thickness/caliper of the sample. Exemplary results can be found in Tables 3-5.

Blast-Resistance Testing:

The resistance of test specimens to a hot particle blast was tested to simulate an electric vehicle high energy battery in a thermal runaway condition. High energy batteries not only burn, but also blast particles that can erode through materials at their high burning temperatures.

After equilibrating the specimen with a 1200° C. flame, the specimen was subjected to a series of grit blasts lasting 10 seconds followed by a 5 second rest period. The grit was blasted at the substrate with a 25 psi compressed air pressure source; the grit particles were 120 grit aluminum oxide non-shaped media. These 10 second blasts with 5 second rest (with continuous application of the flame) were repeated until the flame and grit punctured through the test specimen. The coated side of the test specimen sheet construction was oriented towards the hot particle blast. The number of blasts survived before puncture through the entire construction was recorded and shown in Table 7.

Peel Testing:

Peel adhesion testing was done to measure the adhesion of the coating to substrate.

3M #1205 Polyimide Tape (25.4 micron polymide backing with 25.4 micron acrylate pressure-sensitive adhesive), available from 3M Company (St. Paul, MN USA), was adhered to each of the substrates/test specimens, then aged at 65° C. for 20 minutes to set the adhesive. The tape was then peeled off of the various substrates in a 180 degree peel mode at 30.5 cm/min. The peel test results are shown in Table 7.

Materials

Materials for Inorganic Coating Compositions

KASIL® 2130 Potassium silicate solution (MR>3.2; 30% Solids), available from National Silicates (Germany).

KASIL® 1 Potassium silicate solution (MR>3.2; 29% Solids), available from PQ Corporation (Valley Forge, PA USA).

KASIL® 6 Potassium silicate solution (2.6<MR≤3.2; 39% Solids), available from PQ Corporation (Valley Forge, PA USA).

K® Sodium Silicate solution (2.6<MR≤3.2; 43% Solids), available from PQ Corporation (Valley Forge, PA USA).

Sodium Silicate Solution, extra pure, available from Merck KGaA (Germany).

ACRONAL® S980S Acrylic Polymer Dispersion (45% Solids), available from BASF (Germany).

KELTROL® BT Xanthan Gum, available from CP Kelco (Atlanta, GA, USA).

Poly(vinyl alcohol), 95% hydrolyzed, average M.W. 95000, also available from Fisher Scientific AG (Switzerland).

CELLOSIZE™ QP100MH Hydroxyethyl Cellulose, available from Dow Chemical Company (Midland, MI, USA).

METAPOR® MVV Metakaolin, available from Dennert Poraver GmbH (Germany).

SYMULOX® M72 Synthetic Sintered Mullite, available from Nabaltec (Germany).

Phlogopite Mica, available from Georg.H.Luh GmbH (Germany).

Suzorite 200-HK phlogopite mica (1300 micron median particle size), available from Imerys (Boucherville, Quebec, CA).

Suzorite 20S phlogopite mica (60 micron median particle size), available from Imerys (Boucherville, Quebec, CA).

Aspaga Mica, available from Aspager Bergbau und Mineralwerke GmbH & Co KG (Germany).

Polyplate® P Water Washed Kaolin Clay, available from Kamin LLC (Macon, GA, USA).

Unifrax E-Glass Microfibers (6 micron diameter, 6 mm length), available from Unifrax (Tonawanda, NY USA).

3M™ Nextel™ Chopped Fiber 720Nextel Fiber, available from 3M Company (St. Paul, MN USA).

Materials for Flame Resistant Paper (FRP)

EC6-6 E-glass chopped strand fibers (6 mm length, 6 μm diameter), available from Lauscha Fiber International Corporation (Charlotte, NC, USA).

B-06-F microglass fibers (0.65 μm diameter, 2.47 $m^2/g$ surface area), available from Lauscha Fiber International Corporation (Charlotte, NC, USA).

M-aramid fibers (2 denier, 6 mm length), available from Aramid HPM, LLC (Hilton Head, SC, USA).

Suzorite 200-HK phlogopite mica, available from Imerys (Boucherville, Quebec, CA).

Delaminated kaolin clay Hydraprint, available from Kamin LLC (Macon, GA, USA).

Calcined kaolin clay Kamin 70C, available from Kamin LLC (Macon, GA, USA).

N-sodium silicate, available from PQ Corporation (Valley Forge, PA, USA).

Mica Substrate Materials 0.2 mm Glory Mica rigid phlogopite mica sheet (R-5660-H3), having a measured basis weight of 386 $g/m^2$, available from GloryMica (Zhejiang, China).

0.5 mm Glory Mica rigid phlogopite mica sheet (R-5660-H3), having a measured basis weight of 975 $g/m^2$, available from GloryMica (Zhejiang, China).

0.8 mm Glory Mica rigid phlogopite mica sheet (R-5660-H3), having a measured basis weight of 1736 $g/m^2$, available from GloryMica (Zhejiang, China).

1.0 mm Glory Mica rigid phlogopite mica sheet (R-5660-H3), having a measured basis weight of 1984 $g/m^2$, available from GloryMica (Zhejiang, China).

Coating Compositions

The binder material(s) was placed in a mixing vessel. The inorganic particles were ground and sieved to produce particles having an average particle size of 10 microns. The sieved particles were added to the binder solution to yield a homogeneous coating.

The composition information is provided in Table 1 and Test data provided in Tables 3 and 4 for the coatings of examples Ex. 1-Ex. 4. The composition information for examples Ex. 8-Ex. 12 is provided in Table 2 and Test data provided in Table 5.

Examples Ex. 5-Ex. 7

Examples Ex. 5-Ex. 7 were modified to include a rheology modifier. The binder was placed in a mixing vessel and the rheology modifier was added and stirred until the rheology modifier dissolved.

The inorganic particles were ground and sieved to produce particles having an average particle size of 10 microns. The sieved particles were added to the binder solution to yield a homogeneous coating. The composition information is provided in Table 1 for the coatings of examples Ex. 5-Ex. 7.

TABLE 1

Potassium silicate based inorganic coating compositions
(all values are provided percent solids in the dried coating)

|  |  | C1 | Ex. 1 | Ex. 2 | Ex. 3 | Ex. 4 | Ex. 5 | Ex. 6 | Ex. 7 |
|---|---|---|---|---|---|---|---|---|---|
| KASIL 2130 Potassium Silicate | Binder | 100 | 42.9 | 42.9 | 18.8 | 18.8 | 42.4 | 42.4 | 42.7 |
| Acronal S980S | Binder |  |  |  | 31.2 | 31.2 |  |  |  |
| Metakaolin | Particle |  | 57.1 |  | 50.0 |  | 56.6 | 56.6 | 56.9 |
| Mullite | Particle |  |  | 57.1 |  | 50.0 |  |  |  |
| Keltrol BT | Rheology modifier |  |  |  |  |  | 1.0 |  |  |
| 5% Solution PVA 95 T/95% | Rheology modifier |  |  |  |  |  |  | 1.0 |  |
| Cellosize QP100MH | Rheology modifier |  |  |  |  |  |  |  | 0.4 |

TABLE 2

Additional inorganic coating compositions
(all values are provided percent solids in the dried coating)

|  |  | Ex. 1 | Ex. 8 | Ex. 9 | Ex. 10 | Ex. 11 | Ex. 12 |
|---|---|---|---|---|---|---|---|
| 2130 Potassium | Binder | 42.9 | 42.8 | 42.8 |  |  |  |

TABLE 2-continued

Additional inorganic coating compositions
(all values are provided percent solids in the dried coating)

| | | Ex. 1 | Ex. 8 | Ex. 9 | Ex. 10 | Ex. 11 | Ex. 12 |
|---|---|---|---|---|---|---|---|
| Silicate | | | | | | | |
| Sodium Silicate (Merck) | Binder | | | | 42.9 | 42.8 | 42.8 |
| Metakaolin | Particle | 57.1 | 28.6 | 28.6 | 57.1 | 28.6 | 28.6 |
| Mullite | Particle | | | | | | |
| Phlogopite Mica (Georg.H.Luh) | Particle | | | 28.6 | | 28.6 | |
| Muscovite Mica | Particle | | | 28.6 | | | 28.6 |

The exemplary coating compositions were coated on a flame resistant paper (FRP) described below or boards (FRB), or a three-dimensional flame resistant barrier, as described below. The flame resistance boards (FRB) used is the flame resistant board described in Example 8-B in in PCT Publication No. WO 2020/023357.

Uncoated flame resistant paper FRB or boards were used as control samples. Test results for the exemplary compositions of Tables 1 and 2 are provided in provided in Tables 3-5.

Flame Resistant Paver (FRP) and Three-Dimensional Flame Resistant Paver Articles A mixture of 3.5 wt. % EC6-6 E-glass fibers (6 mm length, 6 μm diameter), 3.9 wt. % m-aramid fiber, 1.6 wt. % B-06-F microglass fibers (0.65 μm diameter, 2.47 m$^2$/g), 28.0 wt. % 200-HK phlogopite mica, 21.0 wt. % calcined kaolin clay Kamin 70C, were pre-dispersed in water to form an aqueous slurry with a solids content of about 0.05-1% by weight in a Waring blender and then mixed into a larger container with 33.0 wt. % delaminated kaolin clay Hydraprint and 9.0 wt. % N-sodium silicate. Additional materials such as defoamers, surfactants, forming aids, pH-adjusting materials, known to those skilled in the art can also be incorporated. Dewatering was done through a papermaking screen and press (Williams Standard Pulp Testing Apparatus) to form a precursor sheet of flame resistant paper material which can be dried to form flat sheets of flame resistant paper or board.

Alternatively, the precursor sheet of flame resistant paper material can be applied onto the surface of a three-dimensional and dried on the mold to create a three-dimensional molded flame resistant article. Exemplary three-dimensional molded flame resistant barriers are described in commonly assigned U.S. Provisional Application No. 62/942,284, "Flame Resistant Materials for Electric Vehicle Battery Applications", filed on Dec. 2, 2019, incorporated herein by reference in its entirety.

TABLE 3

Properties of exemplary coatings disposed on insulating paper (FRP)

| | 25° C. Pretreatment | | | 1200° C. Pretreatment | | | Wt. % coating in coated paper |
|---|---|---|---|---|---|---|---|
| Sample | Caliper (mm) | Time (s) | Resistance (s/mm) | Caliper (mm) | Time (s) | Resistance (s/mm) | |
| C1 | 0.45 | 71 | 158 | 0.60 | 3 | 5 | 41 |
| Ex. 1 | 1.10 | 85 | 77 | 0.60 | >360 | 600 | 42 |
| Ex. 2 | 0.60 | 70 | 117 | 0.60 | >360 | 632 | 41 |
| Ex. 3 | 1.06 | 399 | 376 | 0.58 | 120 | 207 | 50 |
| Ex. 4 | 0.70 | 352 | 503 | 0.60 | 26 | 43 | 42 |
| uncoated | 0.39 | 60 | 154 | 0.57 | 12 | 21 | 0 |

TABLE 4

Properties of exemplary coating compositions disposed on a flame resistant board (FRB)

| | 25° C. Pretreatment | | | 1200° C. Pretreatment | | | Wt. % coating in coated paper |
|---|---|---|---|---|---|---|---|
| Sample | Caliper (mm) | Time (s) | Resistance (s/mm) | Caliper (mm) | Time (s) | Resistance (s/mm) | |
| C1 | 120 | 71 | 18 | 2.00 | >300 | 150 | 25 |
| Ex. 1 | 1.65 | 85 | 26 | 2.50 | >300 | 120 | 43 |
| Ex. 2 | 1.30 | 70 | 22 | 2.00 | 73 | 37 | 29 |
| Ex. 3 | 1.65 | 399 | 70 | 2.00 | >300 | 150 | 49 |
| Ex. 4 | 1.30 | 352 | 43 | 2.00 | >300 | 150 | 38 |
| uncoated | 1.20 | 60 | 5 | 1.20 | >300 | 294 | 0 |

The coating compositions in examples Ex. 1-4 transformed into a ceramic-like layer when subjected to the high temperature preconditioning at 1200° C. which generally provided improved abrasion resistance to the coated articles.

TABLE 5

Properties of additional coating compositions disposed on a flame resistant paper board (FRB)

| | 1000° C. Pretreatment | | | 1200° C. Pretreatment | | | Wt. % coating in coated paper |
|---|---|---|---|---|---|---|---|
| Sample | Caliper (mm) | Time (s) | Resistance (s/mm) | Caliper (mm) | Time (s) | Resistance (s/mm) | |
| Ex. 1 | 1.00 | 17 | 17 | 0.60 | >300 | >500 | 43 |
| Ex. 8 | 0.71 | 15 | 21 | 0.40 | >300 | >700 | 40 |
| Ex. 9 | 0.94 | 15 | 16 | 0.90 | >300 | >334 | 40 |
| Ex. 10 | 1.23 | 83 | 67 | 1.10 | >300 | 151 | 45 |
| Ex. 11 | 1.20 | 209 | 174 | 1.09 | >300 | >275 | 47 |
| Ex. 12 | 1.22 | 47 | 39 | 1.12 | >300 | >268 | 46 |

The inorganic additive phlogopite with metakaolin stabilized the TFRB board yielding higher abrasive stability. Interestingly, the coatings with sodium silicate (Ex. 10-12) seems to begin stabilizing the TFRB at 1000° C. while the coatings with potassium silicate (Ex. 1, 8, and 9) seems to begin stabilizing the TFRB at about 1200° C.

Figure 2:
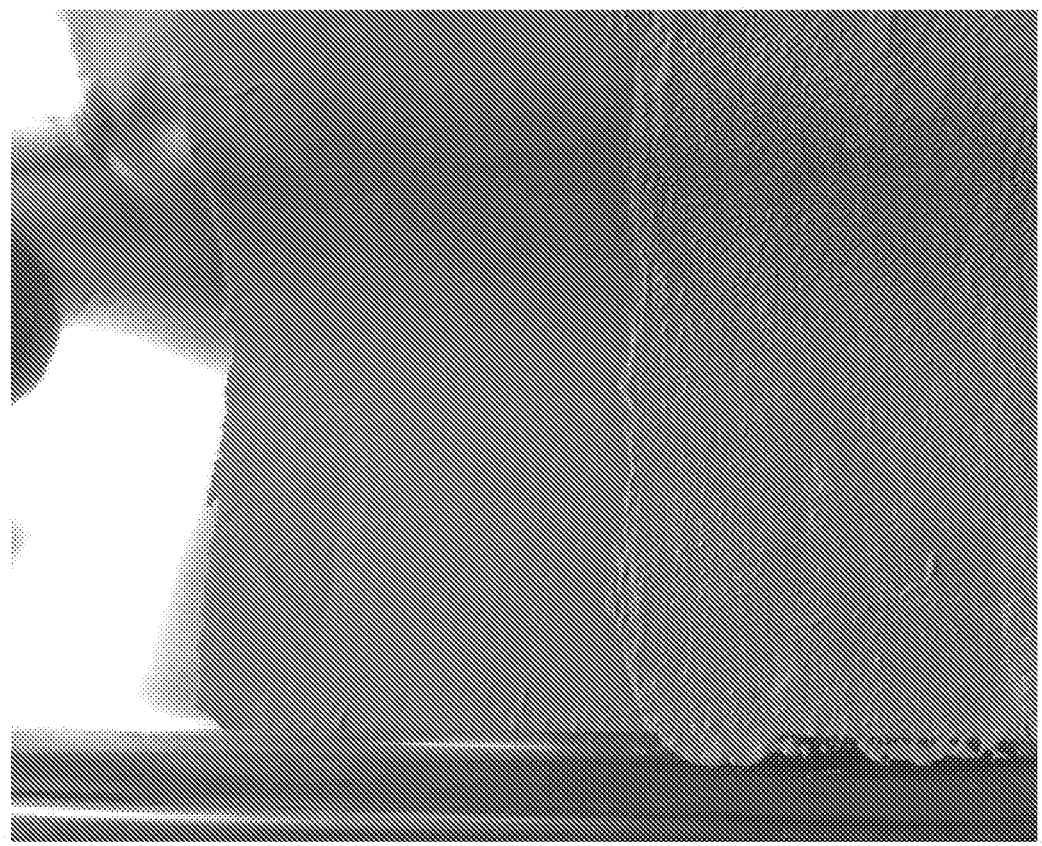
FIG. 2 shows an exemplary battery pack that includes a thermal barrier formed from an insulation material according to an aspect of the invention.

FIG. 2 shows an exemplary three-dimensional fire barrier article wherein a three-dimensional molded flame resistant paper article is coated with the coating composition Ex. 3.

Examples Ex. 13-Ex. 18

For each coating composition, all solid materials were added into the mixing vessel and manually mixed. The liquid binder was then added and manually mixed until the solids in the resultant slurry or paste were well-wetted. The mixture was then mixed in a FlackTek SpeedMixer for 2 minutes at 3,000 rpm. The compositions were then coated onto either 0.2 or 0.5 mm thick mica sheets and dried overnight at ambient conditions. Final drying conditions were first 80° C. for 40 minutes then the temperature was elevated to 120° C. for 60 minutes. Examples Ex. 13-Ex. 17 comprised exemplary coatings coated on 0.2 mm mica sheet substrates at a coating weight of 1350 g/m$^2$ (dry basis weight) to yield a coated construction having an overall basis weight of 1736 g/m$^2$, which is equivalent to the basis weight of the 0.8 mm mica sheet. Example Ex. 18 comprised another exemplary coating composition coated onto a 0.5 mm mica sheet substrate at a coating weight of 1010 g/m$^2$ (dry basis weight) to yield a coated construction having an overall basis weight of 1984 g/m$^2$, which is equivalent to the basis weight of the 1.0 mm mica sheet. The coatings used on the coated constructions of examples Ex. 13-Ex. 18 are provided in Table 6.

Example C2) due to exfoliation of surface mica flakes because the individual mica flakes of the mica sheet are not strongly bonded to one another. The adhesive of the tape pulled off a thin layer of the mica platelets, effectively detackifying the adhesive demonstrating the difficulty in bonding to the surface of a mica sheet. In contrast, each of the exemplary coating compositions of Examples Ex. 13-Ex. 18, produced much higher peel values. The peel values of the acrylate adhesive from the coatings of the invention ranged between 13 to 17 times that of the adhesion of the acrylate adhesive to the surface of the mica sheet.

Table 7 also shows how the exemplary coated mica sheets and corresponding uncoated mica sheets having the same basis weight as the coated mica sheets performed with respect to blast resistance. Comparative Example C3 survived 6 blasts (average of two separate tests), while Ex. 13-Ex. 15, at the same total basis weight as Comparative Example C3, survived about twice as many hot particle blasts. Example Ex. 16 withstood one more hot particle blast than Comparative Example C3, demonstrating that it, too, provided better blast protection than a mica sheet alone. Similarly, Ex. 18 survived longer than the corresponding uncoated mica sheet (Comparative Example C4). Ex. 18 survive 16 hot particle blasts without puncturing. The test was stopped even though the construction had not failed. This again demonstrates the ability of this coating on the mica sheet to provide excellent blast resistance while also having a superior adhesion to pressure sensitive adhesives.

Examples Ex. 13-Ex. 18 illustrate the benefits of coating mica substrates with the exemplary coating compositions described herein. In general, Mica materials are known to have excellent dielectric strength, in the range of 15-30 kV/mm. The exemplary inorganic coatings shown in Table

TABLE 6

Coating compositions used to coat mica substrates

| Sample | Binder | Binder (Wt. %) | DI H$_2$O (Wt. %) | Polyplate P (Wt. %) | Glass Fiber (Wt. %) | Nextel Fiber (Wt. %) | Suzorite 20 S (Wt. %) | Suzorite 200 HK (Wt. %) |
|---|---|---|---|---|---|---|---|---|
| Ex. 13 | KASIL 1 | 0.54 | | 0.36 | 0.01 | | 0.09 | |
| Ex. 14 | KASIL 1 | 0.54 | | 0.36 | | 0.01 | 0.09 | |
| Ex. 15 | KASIL 6 | 0.634 | 0.008 | 0.357 | | | | |
| Ex. 16 | K Sodium Silicate | 0.583 | | 0.417 | | | | |
| Ex. 17 | KASIL 1 | 0.55 | | | | | 0.10 | 0.35 |
| Ex. 18 | KASIL 1 | 0.54 | | 0.36 | | 0.01 | 0.09 | |

TABLE 7

Properties of coating compositions disposed on mica sheets

| Sample | Peel Value (N/cm) | Basis Weight (g/m$^2$) | Blast Resistance (No. of Blasts survived) |
|---|---|---|---|
| C2 (0.5 mm mica sheet) | 0.13 | — | — |
| C3 (0.8 mm mica sheet) | | 1736 | 6 |
| Ex. 13 | 2.0 | 1736 | 13 |
| Ex. 14 | 2.2 | 1736 | 12 |
| Ex. 15 | 2.2 | 1736 | 11 |
| Ex. 16 | 2.1 | 1736 | 7 |
| Ex. 17 | 2.0 | 1736 | 4 |
| Ex. 18 | 1.7 | 1984 | 16+ |
| C4 (0.8 mm mica sheet) | | 1984 | 8.5 |

As shown in Table 7, the acrylate adhesive had a very low peel value for removal from the mica sheet (Comparative 6, when fully dried, have dielectric strengths of around 5-10 kV/mm. Thus, mica sheet coated with the exemplary inorganic coating can provide an excellent balance of adhesion, blast resistance, and dielectric strength required for protection in high energy battery applications.

Various modifications of the exemplary electrical insulating materials described herein including equivalent processes, as well as numerous structures to which the present invention may be applicable will be readily apparent to those of skill in the art to which the present invention is directed upon review of the present specification.

What is claimed is:
1. A fire barrier article comprising,
   a flame-resistant substrate layer having a first major surface and a second major surface, wherein the flame resistance substrate layer is a phlogopite mica sheet; and
   a fire protection coating composition comprising:

an inorganic binder, being potassium silicate;
a first inorganic filler is phlogopite mica having 60 micron median particle size; and
a second inorganic filler is kaolin clay,
a third inorganic filler is a glass fiber,
  wherein the potassium silicate is present in an amount of 54 wt %,
  wherein the first inorganic filler is present in an amount of 0.09 wt %,
  wherein the second inorganic filler is present in an amount of 36 wt %, and
  wherein the third inorganic filler is present in an amount of 0.01 wt %, wt % being with respect to the weight of the fire protection coating composition and wherein the fire protection coating is disposed on a substantial portion of the first major surface of the flame-resistant substrate layer.

2. The fire protection coating composition of claim 1, further comprising a rheological modifier.

3. The fire protection coating composition of claim 1, wherein the fire protection coating composition transforms to a ceramic-like material upon exposure to elevated temperatures (>1000° C.) after drying.

4. The fire protection coating composition of claim 1, further comprising water.

5. A battery module comprising:
  a plurality of battery cells separated from one another by a gap; and
  the fire barrier article of claim 1 disposed in the gap between the battery cells.

6. A battery module comprising:
  a compartment lid having an inner and outer major surface, the inner major surface covering a plurality of battery cells; and
  the fire barrier article of claim 1 disposed on the inner surface of the compartment lid.

7. The fire barrier article of claim 1, characterized by a blast resistance of at least 1 according to Blast-Resistance Test.

* * * * *